United States Patent
Couvert et al.

(10) Patent No.: US 8,174,533 B2
(45) Date of Patent: May 8, 2012

(54) DATA MANAGEMENT FOR IMAGE PROCESSING

(75) Inventors: Patrice Couvert, Saint-Marcellin (FR); Anthony Philippe, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 1266 days.

(21) Appl. No.: 11/766,460

(22) Filed: Jun. 21, 2007

(65) Prior Publication Data
US 2008/0024509 A1 Jan. 31, 2008

(30) Foreign Application Priority Data
Jun. 21, 2006 (FR) .................................... 06 05559

(51) Int. Cl.
*G06F 12/00* (2006.01)

(52) U.S. Cl. ........ 345/564; 345/474; 345/530; 345/531; 345/537; 345/572

(58) Field of Classification Search ............. 375/240.12; 345/572
See application file for complete search history.

(56) References Cited

U.S. PATENT DOCUMENTS

| | | | |
|---|---|---|---|
| 5,675,387 A | 10/1997 | Hoogenboom et al. | |
| 5,754,674 A * | 5/1998 | Ott et al. | 382/112 |
| 5,900,865 A * | 5/1999 | Howe | 345/572 |
| 5,963,222 A | 10/1999 | Cheney et al. | |
| 6,310,918 B1 | 10/2001 | Saha et al. | |
| 7,508,397 B1 * | 3/2009 | Molnar et al. | 345/562 |
| 7,551,178 B2 * | 6/2009 | Chung et al. | 345/582 |
| 7,653,265 B2 * | 1/2010 | Ruggiero | 382/303 |
| 2002/0015101 A1 * | 2/2002 | Mead et al. | 348/333.01 |
| 2002/0118203 A1 * | 8/2002 | Muramatsu et al. | 345/542 |
| 2004/0008780 A1 * | 1/2004 | Lai et al. | 375/240.16 |
| 2004/0057522 A1 | 3/2004 | Wu et al. | |
| 2004/0212624 A1 * | 10/2004 | Reynolds | 345/531 |
| 2005/0013362 A1 * | 1/2005 | Pearson et al. | 375/240.12 |
| 2005/0232361 A1 * | 10/2005 | Nakaya et al. | 375/240.17 |
| 2007/0046821 A1 * | 3/2007 | Mead et al. | 348/571 |

OTHER PUBLICATIONS

Briman, E., "Portable Multimedia: Powerful, Flexible Solutions Powered by CEVA's Mobile-Media," CEVA White Paper, 2005, pp. 1-9.

Ramadurai, V. et al., "Implementation of H.264 Decoder on Sandblaster DSP," IEEE International Conference on Amsterdam, The Netherlands, Jul. 6, 2005, pp. 694-698.

Sun, H. et al., "A New Approach for Memory Efficient ATV Decoding," IEEE Transactions on Consumer Electronics, vol. 43, No. 3, Aug. 1, 1997, pp. 517-525.

* cited by examiner

*Primary Examiner* — Xiao M. Wu
*Assistant Examiner* — Phi Hoang
(74) *Attorney, Agent, or Firm* — Seed IP Law Group PLLC

(57) ABSTRACT

A system comprises a memory storing data at addresses associated with pixels in images, each address being linked by a function to coordinates of a pixel in an ordered image reference frame, a device for processing the data associated with the pixels, where a pixel being processed is referenced by an associated vector relative to a reference pixel, and an interface device providing data to the processing device. A data request indicates a vector associated with a pixel being processed. The coordinates of the reference pixel are determined by applying the function to an address associated with the reference pixel. Next the coordinates of the pixel being processed are obtained based on the coordinates of the reference pixel and on the vector. Then the address of the data associated with the pixel being processed is determined by applying the inverse function to the function to the coordinates of the pixel being processed.

9 Claims, 5 Drawing Sheets

DATA MANAGEMENT FOR IMAGE PROCESSING

CROSS-REFERENCE TO RELATED APPLICATION

This application claims the benefit under 35 U.S.C. §119(a) of French Patent Application No 06 05559 filed Jun. 21, 2006, which application is incorporated herein by reference in its entirety.

BACKGROUND

1. Technical Field

The present invention relates to the processing of images, and more particularly to the management of data relating to images stored in memory external to an image processing device.

2. Description of the Related Art

In certain applications, for example in the domain of video, a mass storage device, or external memory, stores data to be processed by a processor of a data processing device according to a given algorithm. The data can be stored in this memory in a format which differs from the data format used by the processor.

In particular, these data stored in external memory can correspond to information on chrominance and luminance. Video images are conventionally encoded using such information. To covert a video signal into chrominance data and luminance data, the signal is sampled. Then chrominance and/or luminance data are associated with all or part of the samples depending on the encoding used for the image.

Different encoding formats are conventionally used. For example, the terms '4:2:2' and '4:2:0' designate different encoding formats which are conventionally used, each describing a different structure for a digital image. The term 4:2:2 indicates that the chrominance is horizontally subsampled by a factor of two relative to the luminance. The term 4:2:0 signifies that the chrominance is horizontally and vertically subsampled by a factor of two relative to the luminance. Thus the stored data vary not only as a function of the encoding of the video image, which provides more or less luminance data and chrominance data for a video image, but also as a function of the storage format of the encoded data, because the chrominance and luminance data can successively alternate in memory in the order of the pixels of an image or can be stored separately with the chrominance data in one place and the luminance data in another.

To retrieve data from external memory, it is conventional to use a DMA device (Direct Memory Access). A DMA device enables direct transfers of data between external memory and the internal memory associated with the processor without requiring the intervention of the microprocessor, with some exceptions, such as when initiating and concluding the data transfer.

Generally, the processor processes video data relative to the respective positions of the pixels which form the video images.

The data are stored at respective addresses in the external memory, then, in order for the processor to process the data, they are requested via the DMA as a function of the position of the pixels with which they are associated, generally meaning as a function of the spatial coordinates of the different pixels in the images.

For some of the processing applied by the processor, the latter may request via the DMA the retrieval of certain data from external memory without knowing the format of the data stored in the external memory. Therefore the processor may not be able to indicate to the DMA the memory address or addresses corresponding to the data it requires.

In such conditions, the DMA is responsible for translating the information received in a data request from the processing device into an address according to the storage format in external memory. To perform such a translation and retrieve the requested data from the external memory, a fixed correspondence rule is generally determined in the DMA to establish a correspondence between the information received in the request and an address in the external memory.

But such a fixed correspondence rule is directly linked to the storage formats used. It can therefore be complex and difficult to adapt a DMA to another storage format in external memory.

BRIEF SUMMARY

One embodiment of the invention increases the flexibility of a DMA, and provides a DMA which is able to adapt more easily to different storage formats in external memory.

A first embodiment of the invention proposes a method for data management in an image processing system comprising:

a memory which stores at respective data addresses the data respectively associated with pixels in images, with each data address linked by a bijective function to the respective coordinates of an associated pixel in an ordered image reference frame relating to a position of pixels in the image, a processing device comprising a processor for processing the data respectively associated with the pixels, a pixel to be processed by the processing device being pointed to in an image by an associated vector from a reference pixel, and an interface device for reading the data in the memory and providing the read data to the processing device, said interface device knowing the address of the data associated with a reference pixel.

The method comprises the following steps executed in the interface device:

/a/ receiving a data request indicating a vector associated with a pixel to be processed, /b/ determining the coordinates of the reference pixel by applying the bijective function to the address of the data associated with the reference pixel, /c/ obtaining the coordinates of the pixel to be processed, based, on one hand, on the coordinates of the reference pixel as determined in step /b/ and, on the other hand, on the vector associated with the pixel to be processed, /d/ determining the address of the data associated with the pixel to be processed by applying the inverse function of the bijective function to the coordinates of the pixel to be processed as obtained in step /c/, and /e/ providing the processor with the data read in the memory at the address determined in step /d/.

The vector indicated in the request received by the processing device indicates a displacement from a reference pixel to the pixel to be processed in the image in question. The interface device knows the address of the data associated with the reference pixel. It then applies the bijective function to this known address in order to obtain the coordinates of the reference pixel in the ordered image reference frame.

Thus at this stage the interface device advantageously can apply the displacement corresponding to the vector, indicated in the request, within the ordered image reference frame. Such an operation is simple to implement because it is performed in a reference system which is linked to the relative spatial positions of the pixels in the image, and it is therefore easy within this reference system to apply the vector indicated in the request.

The interface device can thus obtain the coordinates of the pixel to be processed, which it translates into an address in memory by applying the inverse function of the bijective function. Then it can retrieve from this address the data associated with the pixel to be processed and can provide these data to the processing device.

The bijective function enables the interface device to process the information received from the processing device, in the ordered image reference frame.

The use of such a function offers significant flexibility in retrieving data from memory, particularly in the case of a change in the storage format. Modifications to just the bijective function can adapt the processing device to a change in the memory storage format.

The bijective function is defined as a function of both the storage format in memory and the ordered image reference frame.

In one embodiment of the invention, an image is divided into multiple macroblocks of pixels.

The data associated with the pixels in a same macroblock of pixels are arranged in a corresponding macroblock of data, in a first arrangement relative to the respective positions of the pixels in said macroblock of pixels.

The macroblocks of data are arranged in memory in a second arrangement relative to the respective positions of the macroblocks of pixels in the image.

The ordered image reference frame is defined based on, on one hand, spatial coordinates of the pixel to be processed in a spatial reference frame for the image and, on the other hand, on the second arrangement.

Thus the ordered image reference frame advantageously reflects the second arrangement. If only the second arrangement changes in the memory storage format, meaning the arrangement of the macroblocks of data in relation to each other, the ordered image reference frame can easily be modified so as to adapt the bijective function simply and effectively to the change in the storage format.

In one embodiment of the invention, the second arrangement is such that columns of $2^N$ macroblocks of data are stored one after another by successively scanning in the image the corresponding rows of columns of $2^N$ macroblocks of pixels. The ordered image reference frame can correspond to the macroblocks of pixels of an image, arranged on the basis of the second arrangement, with this ordered image reference frame then comprising 2N macroblocks of pixels arranged along a vertical axis.

The coordinates X' and Y' in the ordered image reference frame for a pixel having the spatial coordinates X and Y in the image satisfy the following equations:

$$X' = X + \lfloor Y/P_{col\text{-}ref} \rfloor \times P_{line\text{-}image}$$

$$Y' = Y \bmod P_{col\text{-}ref}$$

where mod corresponds to a modulus operation,
$P_{col\text{-}ref}$ corresponds to the number of pixels per column in the ordered image reference frame, where $P_{col\text{-}ref}$ is equal to $2^N \times P_{col\text{-}MB}$,
$2^N$ corresponds to the number of macroblocks per column in the ordered image reference frame, where N is an integer,
$P_{col\text{-}MB}$ corresponds to the number of pixels per column in a macroblock, and
$P_{line\text{-}image}$ corresponds to the number of pixels per row in an image.

Thus, in the case where the macroblocks of data are arranged in memory in an order consisting of storing columns of $2^N$ macroblocks of the image by successively examining the rows of columns of $2^N$ macroblocks, the spatial coordinates of a pixel in an image can easily be translated into coordinates in the ordered image reference frame.

In this embodiment of the invention, in step /c/ the coordinates X" and Y" of the pixel to be processed satisfy the following equations:

$$X'' = \{X' + X_v + (\lfloor Y_v/P_{col\text{-}ref} \rfloor + \lfloor (Y' + Y_v \bmod P_{col\text{-}ref}) \bmod P_{col\text{-}ref} \rfloor\} \times P_{line\text{-}image}$$

$$Y'' = (Y' + Y_v \bmod P_{col\text{-}ref}) \bmod P_{col\text{-}ref}$$

where X' and Y' correspond to the coordinates of the reference pixel in the ordered image reference frame,
$X_v$ and $Y_v$ are the coordinates of the vector,
$P_{col\text{-}ref}$ corresponds to the number of pixels per column in the ordered image reference frame, where $P_{col\text{-}ref}$ is equal to $2^N \times P_{col\text{-}MB}$,
$P_{col\text{-}MB}$ corresponds to the number of pixels per column in a macroblock,
$2^N$ corresponds to the number of macroblocks per column in the ordered image reference frame, where N is an integer,
$P_{line\text{-}image}$ corresponds to the number of pixels per row in the image, and
the mod operation corresponds to a modulus operation.

When a pixel is associated with a data address comprising A bits and when a macroblock comprises $2^M$ pixels per row and per column, with A and M being integers, then the bijective function applied to the data address can be such that:

it establishes a correspondence between the (A−2×M) most significant bits of the address and the most significant bits of the coordinates, which determine in the ordered image reference frame, the macroblock of pixels to which the associated pixel belongs, with this correspondence based on the second arrangement, and it establishes a correspondence between the 2×M least significant bits of the address and the least significant bits of the coordinates, which determine in the ordered image reference frame, said associated pixel in the given macroblock, with this correspondence based on the first arrangement.

The reference pixel can advantageously correspond to the pixel previously processed by the processing device.

Through these measures, an interface device such as a DMA is able to adapt easily to changes in the memory storage format.

A second embodiment of the invention proposes an interface device in an image processing system additionally comprising:

a memory which stores at respective addresses the data respectively associated with pixels in images, each data address being linked by a bijective function to respective coordinates of an associated pixel in an ordered image reference frame relating to a position of pixels in the image, and a processing device comprising a processor for processing the data respectively associated with the pixels, with a pixel to be processed by the processing device being pointed to in an image by an associated vector from a reference pixel.

The interface device knows an address for the data associated with a reference pixel, and comprises:

a first interface unit both for receiving a data request indicating a vector associated with a pixel to be processed and for providing the requested data to the image processing device;

a determination unit for determining an address for the requested data based on both the vector indicated in the request and on said address for the data associated with the reference pixel, by performing the following operations on the basis of said bijective function:

converting a memory address for data into coordinates in the ordered image reference frame, adding the vector associated with the pixel to be processed to coordinates in the ordered image reference frame, and converting the coordinates of a pixel in the ordered image reference frame into an address for the associated data; and a second interface unit for retrieving, on the basis of an address, the corresponding data from memory.

An image can be divided into multiple macroblocks of pixels, with the data associated with pixels in a same macroblock of pixels being arranged in a corresponding macroblock of data in a first arrangement relative to the respective positions of the pixels in the macroblock of pixels, and the macroblocks of data being arranged in memory in a second arrangement relative to the respective positions of the macroblocks of pixels in the image. The determination unit can deduce the coordinates X' and Y' of a pixel in the ordered image reference frame from both the spatial coordinates X and Y in the image of the pixel to be processed and from the second arrangement relative to the macroblocks of pixels in the image.

In one embodiment of the invention, the determination unit manages the application of the second arrangement to the macroblocks of pixels, and obtains the coordinates X' and Y' in the ordered image reference frame for a pixel having spatial coordinates X and Y in the image, using the following equations:

$$X' = X + [Y/P_{col-ref}] \times P_{line-image}$$

$$Y' = Y \bmod P_{col-ref}$$

where mod corresponds to a modulus operation, $P_{col-MB}$ corresponds to the number of pixels per column in a macroblock, $2^N$ corresponds to the number of macroblocks per column in the ordered image reference frame, where N is an integer, $P_{col-ref}$ corresponds to the number of pixels per column in the ordered image reference frame, where $P_{col-ref}$ is equal to $2^N \times P_{col-MB}$, and $P_{line-image}$ corresponds to the number of pixels per row in an image.

The determination unit can determine the coordinates X" and Y" of the pixel to be processed by performing the operation consisting of adding the vector indicated in the request to the coordinates X' and Y' of the reference pixel in the ordered image reference frame, according to the following equations:

$$X'' = \{X' + X_v + ([Y_v/P_{col-ref}] + [(Y' + Y_v \bmod P_{col-ref}) \bmod P_{col-ref}]\} \times P_{row-image}$$

$$Y'' = (Y' + Y_v \bmod P_{col-ref}) \bmod P_{col-ref}$$

where $X_v$ and $Y_v$ are the coordinates of the vector, $P_{col-MB}$ corresponds to the number of pixels per column in a macroblock, $2^N$ corresponds to the number of macroblocks per column in the ordered image reference frame, where N is an integer, $P_{col-ref}$ corresponds to the number of pixels per column in the ordered image reference frame, where $P_{col-ref}$ is equal to $2^N \times P_{col-MB}$, $P_{line-image}$ corresponds to the number of pixels per row in the image, and the mod operation corresponds to a modulus operation.

A third embodiment of the invention proposes a data processing system comprising a processing device, a memory, and an interface device as described above.

Other aspects and advantages of the invention will become apparent upon reading the description of one of its embodiments.

BRIEF DESCRIPTION OF THE SEVERAL VIEWS OF THE DRAWINGS

The invention will also be better understood through the use of illustrations, in which.

DETAILED DESCRIPTION

The term "spatial reference frame of the image" is understood to mean the reference frame for an image defined by a horizontal axis of x coordinates oriented from left to right and a vertical axis of y coordinates oriented from top to bottom.

"Ordered image reference frame" is understood to mean a reference frame linked to the position of the pixels in the image, with a defined order for examining the pixels in this reference frame.

Figure 1:
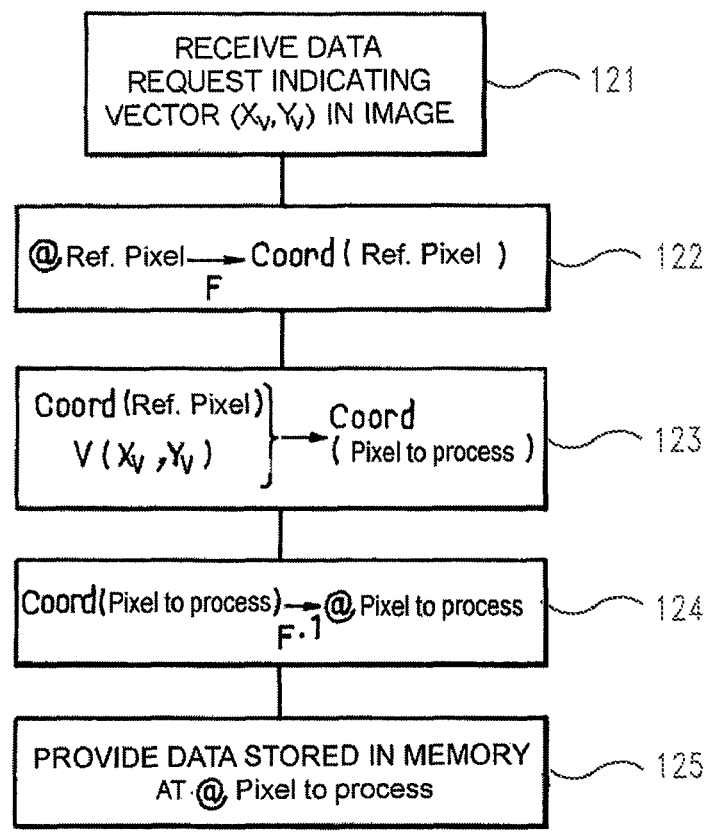
FIG. 1 illustrates the main steps of a method in one embodiment of the invention.

FIG. 1 illustrates the main steps of a method in one embodiment of the invention.

A bijective function F converts a memory address for data into coordinates for a pixel associated with these data in an ordered image reference frame, with the inverse bijective function $F^{-1}$ performing the reverse operation. These functions thus enable moving from a memory addressing system to the ordered image reference frame and vice versa.

In a step 121, an interface device for interfacing with a data processing device and with memory, receives a request for data indicating a vector of spatial coordinates X, Y in a spatial reference frame defined by the rows and columns of pixels which compose an image. Such a request can be issued by the processing device, with the vector indicated in the request pointing to the pixel to be processed relative to a reference pixel. In one embodiment of the invention, the reference pixel can correspond to the pixel that the processing device has just processed in the image currently being processed.

The interface device knows the address in memory of the data associated with the reference pixel. Thus in a step 122, via the bijective function F it is able to determine the coordinates of the reference pixel by applying said bijective function F to the address it knows. In this manner it moves from a memory addressing system to the ordered image reference frame, the latter issuing from the spatial reference frame in which the coordinates of the vector are indicated.

Then in a step 123, the interface device obtains the coordinates of the pixel to be processed, which is the pixel pointed to by the vector received in the data request relative to the reference pixel for which coordinates were previously determined in the ordered image reference frame and based on the vector indicated in the request.

In a step 124, the inverse function is applied to the coordinates of the pixel to be processed. The inverse function $F^{-1}$ of the previously applied bijective function therefore determines the address corresponding to the data relating to the pixel to be processed, meaning the address of the corresponding data. Here, In a step 125, the data which are stored in memory at the address determined in step 124 are retrieved and provided to the processing device.

In the following sections, one embodiment of the invention is described in the case where the reference pixel in question corresponds to the pixel which was previously processed. This is provided as an example.

Figure 2:
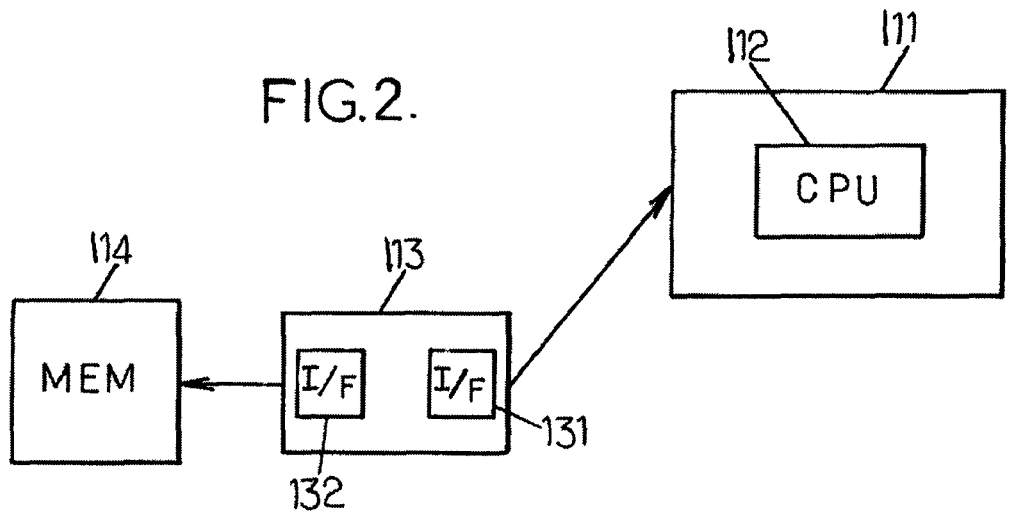
FIG. 2 illustrates an image processing system in which an embodiment of the invention can be implemented.

FIG. 2 illustrates an image processing system according to one embodiment of the invention.

Such a system comprises an image processing device 111 including a processor 112. This image processing device interfaces with an interface device 113, which can advantageously be a DMA device. This interface device 113 comprises a first interface unit 131 for communicating with the processing device 111 and a second interface unit 132 for retrieving data stored in memory 114. Generally such a processing device successively processes different pixels in the images to be processed.

After processing a pixel in an image, data relating to the next pixel to be processed may be requested from the interface device. In this context, the next pixel can advantageously be defined by a vector which points to the next pixel to be processed relative to the previously processed pixel in the spatial reference frame of the image in question.

In one embodiment of the invention, the interface device 113 receives a request for data to be retrieved from memory 114, with this request indicating a vector corresponding to a displacement from one pixel to another pixel in the image in question.

From this displacement, the interface device 113 is responsible for determining the address of the data to be retrieved in order to process this request.

The paragraphs below describe how one embodiment of the invention applies in a manipulation of data by macroblocks of 16 bytes by 16 bytes. However, there is no limitation imposed on the size of the blocks of manipulated data.

In one embodiment of the invention, an image is divided into multiple macroblocks 301 of pixels which lie in succession along the vertical and horizontal axes of the image, with each macroblock of an image corresponding to 256 pixels.

Within a macroblock, the arrangement in memory of the data respectively associated with the pixels in the image can be different from that of the respective pixels in the image. The arrangement of the data in memory is a function of the format used.

By way of a non-limiting example, the following paragraphs describe a storage format for the data associated with the pixels of an image to be processed.

Figure 3:
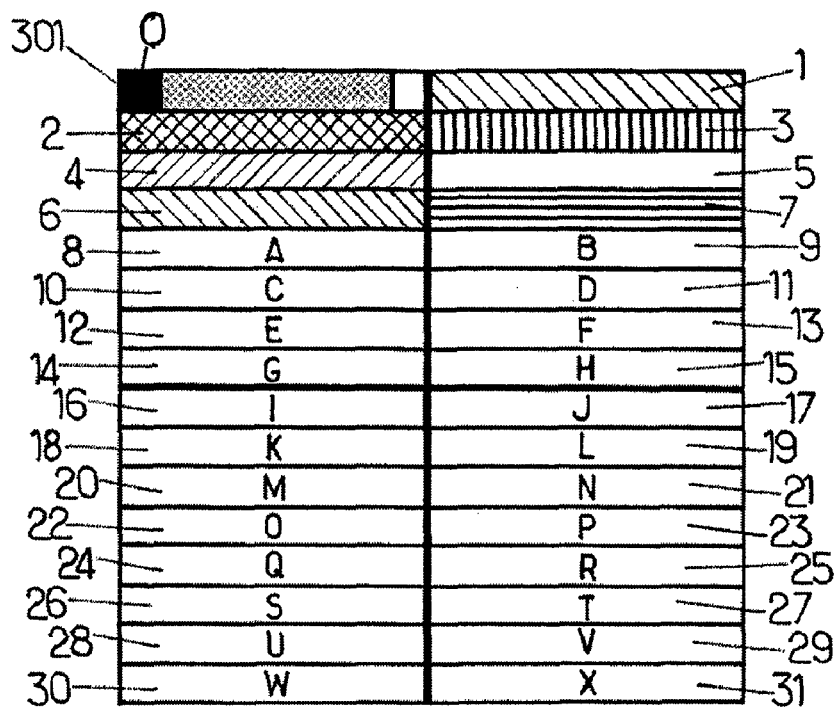
FIG. 3 illustrates a macroblock of pixels in an image in one embodiment of the invention.
Figure 4:
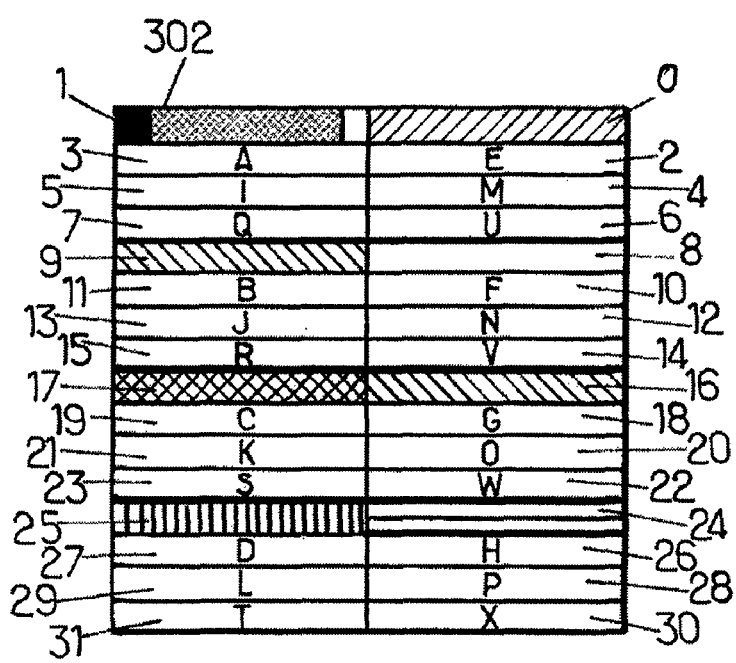
FIG. 4 illustrates, in one embodiment of the invention, a first arrangement of data corresponding to the pixels illustrated in FIG. 3 in a macroblock of data stored in memory.

Thus FIGS. 3 and 4 illustrate an example of a first arrangement in memory of data associated with the pixels in the same macroblock 301. For this first arrangement in memory, the pixels are managed in blocks of 8 pixels.

More specifically, FIG. 3 illustrates 32 blocks of 8 pixels in the same macroblock of pixels in an image, with the data respectively associated with the pixels in this macroblock illustrated in FIG. 4.

Here, 8 bits of data in memory correspond to a pixel in the image. No limitation is imposed on the size of the data associated with a pixel in the image and stored in memory.

Under these conditions, a macroblock of 16×16 pixels is covered in memory by a data matrix of 16×16 bytes. In this example, the bytes of data are manipulated by groups of 8.

The 16×16 pixels in each macroblock in the image are ordered from left to right in each of 16 successive rows in the macroblock of pixels. As the pixels are manipulated by blocks of 8 pixels, they can be indexed from index 0 to index 31 by successively traveling the rows in the macroblock from top to bottom and from left to right.

FIG. 4 illustrates the data stored in memory in a macroblock 302 of data corresponding to the pixel block 301 previously described. These data are associated with the different pixels in the macroblock illustrated in FIG. 3. In this example, the data associated with the pixels in the pixel macroblock in question are ordered from left to right in each of 16 rows in the data macroblock in memory, traveling from top to bottom. The 256 bytes of data have the following respective addresses: 0-255.

Similarly to how the pixels of a macroblock are grouped by blocks of 8 pixels as defined above, the data relating to the 8 pixels in the same block of pixels are grouped into a same block of 8 respective bytes of data. Thus the blocks of data can be indexed from 0-31 as well, by traveling the rows of the macroblock in memory from top to bottom and from right to left.

In this example, the pixel blocks 0-31 in the macroblock of pixels 301 in the image are respectively associated with the data blocks 1, 9, 17, 25, 0, 8, 16, 24, 3, 11, 19, 27, 2, 10, 18, 26, 5, 13, 21, 29, 4, 12, 20, 28, 7, 15, 23, 31, 6, 14, 22, 30 in the data macroblock 302.

Figure 5:
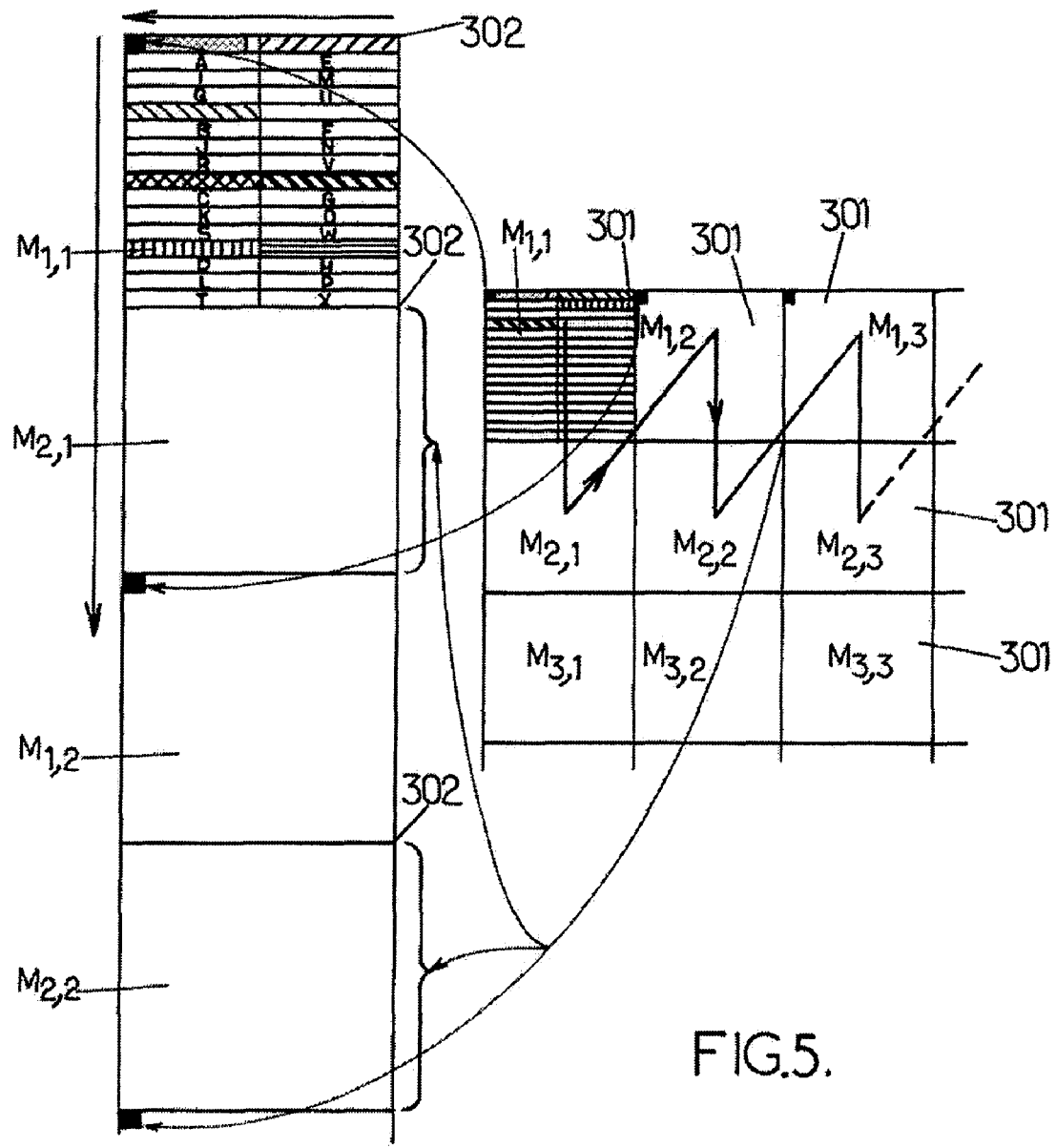
FIG. 5 illustrates, in one embodiment of the invention, a second arrangement of the macroblocks of data in memory in relation to the position of the macroblocks of pixels in the image.

While FIGS. 3 and 4 illustrate within the same data macroblock 302 a first arrangement of the data associated with the successive pixels of a macroblock 301 of an image in one embodiment of the invention, FIG. 5 illustrates a second arrangement of the macroblocks of data in memory relative to the respective positions of the macroblocks of pixels in the image.

In this example, the image comprises multiple pixel macroblocks 301, $M_{i,j}$, where i is between 1 and the maximum number $i_{max}$ of macroblocks in a row in the image in question and j is between 1 and the maximum number $j_{max}$ of macroblocks in a column in the image in question.

In memory, these macroblocks are arranged in the order defined as follows:

$M_{1,1}$; $M_{2,1}$; $M_{1,2}$; $M_{2,2}$; ... $M_{2,jmax}$; $M_{3,1}$; $M_{4,1}$; $M_{3,2}$; ... $M_{4,max}$ ....

Thus within the same macroblock, the data are arranged in memory in a first arrangement and the macroblocks are arranged in memory in a second arrangement.

Figure 6:
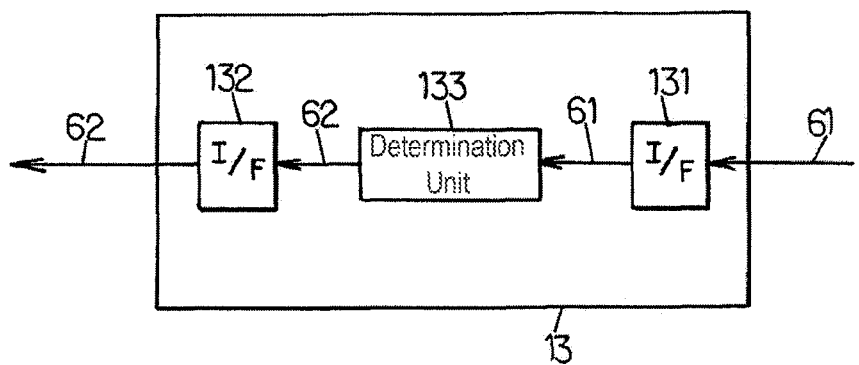
FIG. 6 illustrates an interface device in one embodiment of the invention.

FIG. 6 illustrates the different steps implemented in the interface device 113 in one embodiment of the invention.

Via the first interface unit 131, a data request message 61 is received from the processing device 111. This message indicates a vector of coordinates $X_v$, $Y_v$ in the spatial reference frame of the image.

This vector points to the pixel to be processed relative to a reference pixel for which the interface device knows the address of the associated data.

The interface device 113 advantageously comprises a determination unit 133 for determining an address of the data requested by a request message 61 based on the vector indicated in the request message and on an address for the data associated with the reference pixel.

The determination unit performs the following operations on the basis of a bijective function:

converting an address for data in memory into coordinates in the ordered image reference frame, adding the vector indicated in the request to the coordinates in the ordered image reference frame, and converting the coordinates of a pixel into an address for the associated data.

For this purpose, the conversion unit manages a bijective function F and its inverse function $F^{-1}$, which respectively translate an address for data in memory into the coordinates of the pixel associated with these data in the ordered image reference frame and vice versa.

No limitation is imposed on this reference pixel. This reference pixel presents the following characteristics:

the vector points to a pixel to be processed relative to it, and the interface device knows the address in memory of the data associated with it.

More specifically, the address of the data associated with the reference pixel is converted into the coordinates X' and Y' of the reference pixel in the ordered image reference frame, by applying the bijective function F.

Then the determination unit obtains the coordinates of the pixel to be processed based on these coordinates X' and Y' and on the vector indicated in the request message 61, which has spatial coordinates $X_v$ and $Y_v$ in the image in question.

The equations for obtaining the coordinates of the pixel to be processed, from the spatial coordinates $X_v$ and $Y_v$ of the vector in the image in question and from the coordinates of the reference pixel in the ordered image reference frame, are defined on the basis of the order used in the design of the ordered image reference frame. Thus when this order is based on the second arrangement, the above equations are written as a function of this second arrangement.

Figure 7:
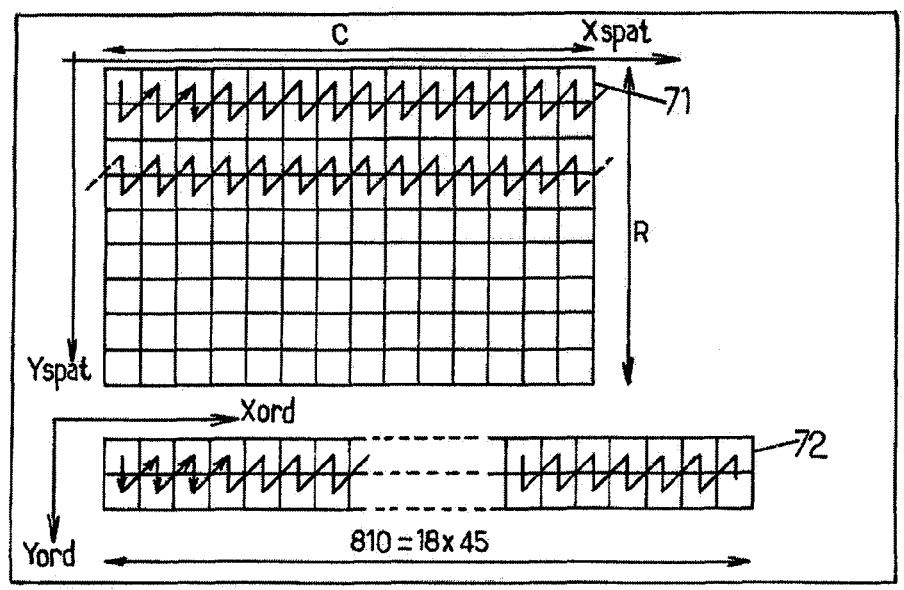
FIG. 7 illustrates an ordered image reference frame in one embodiment of the invention.

The following paragraphs propose such equations in an example of an ordered image coordinate system as illustrated in FIG. 7.

Such an ordered image coordinate system is based on the second arrangement of macroblocks illustrated in FIG. 5.

An image 71 is divided into a number C×R of macroblocks of pixels, where C is an integer corresponding to the number of macroblocks per row in the image and R corresponds to the number of macroblocks per column in the image. Each macroblock in this image is identified by its spatial coordinates in the spatial coordinate system of the image 71, with the x axis $X_{spat}$ oriented from left to right and the y axis $Y_{spat}$ oriented from top to bottom.

In one embodiment of the invention, the macroblocks are arranged in a matrix 72 having (R×C)/2 columns in 2 rows. The rows of macroblocks in the image are therefore successively taken by twos and associated with each other. Thus the last macroblocks in rows k and k+1 are respectively associated with the first macroblocks in rows k+2 and k+3, where k is an even number between 0 and R.

This yields the matrix 72, wherein the macroblocks are traveled in the direction of the arrows as shown in FIG. 7. Each macroblock is defined by its coordinates in an ordered image coordinate system with a horizontal x axis $X_{ord}$ oriented from left to right and a vertical y axis $Y_{ord}$ oriented from top to bottom. Thus the spatial coordinates of a pixel $X_1, Y_1$ in the spatial coordinate system of the image 71 are converted into coordinates $X_2, Y_2$ in the ordered image coordinate system illustrated by the matrix 72, according to the following equations:

$$X_2 = X_1 + [Y_1/32] * P_{line\text{-}image}$$

$$Y_2 = Y_1 \bmod 32$$

where mod is the modulus operation,

[a/b] is the quotient of the division of a by b, and $P_{line\text{-}image}$ is the number of pixels in a row in the image, where $P_{row\text{-}image}$ here satisfies the following equation:

$$P_{line\text{-}image} = 16 \times C.$$

In such a representation, a displacement of two macroblocks, which in the given example is a displacement of 32 pixels on the y axis $Y_{ord}$, corresponds to a displacement of 16 pixels on the x axis $X_{ord}$.

The following sections detail an embodiment of the invention where a bijective function is applied to the memory addresses in order to determine the respective coordinates in the ordered image coordinate system, and its inverse function is applied to the coordinates of the ordered image coordinate system in order to determine the respective memory addresses.

Figure 8:
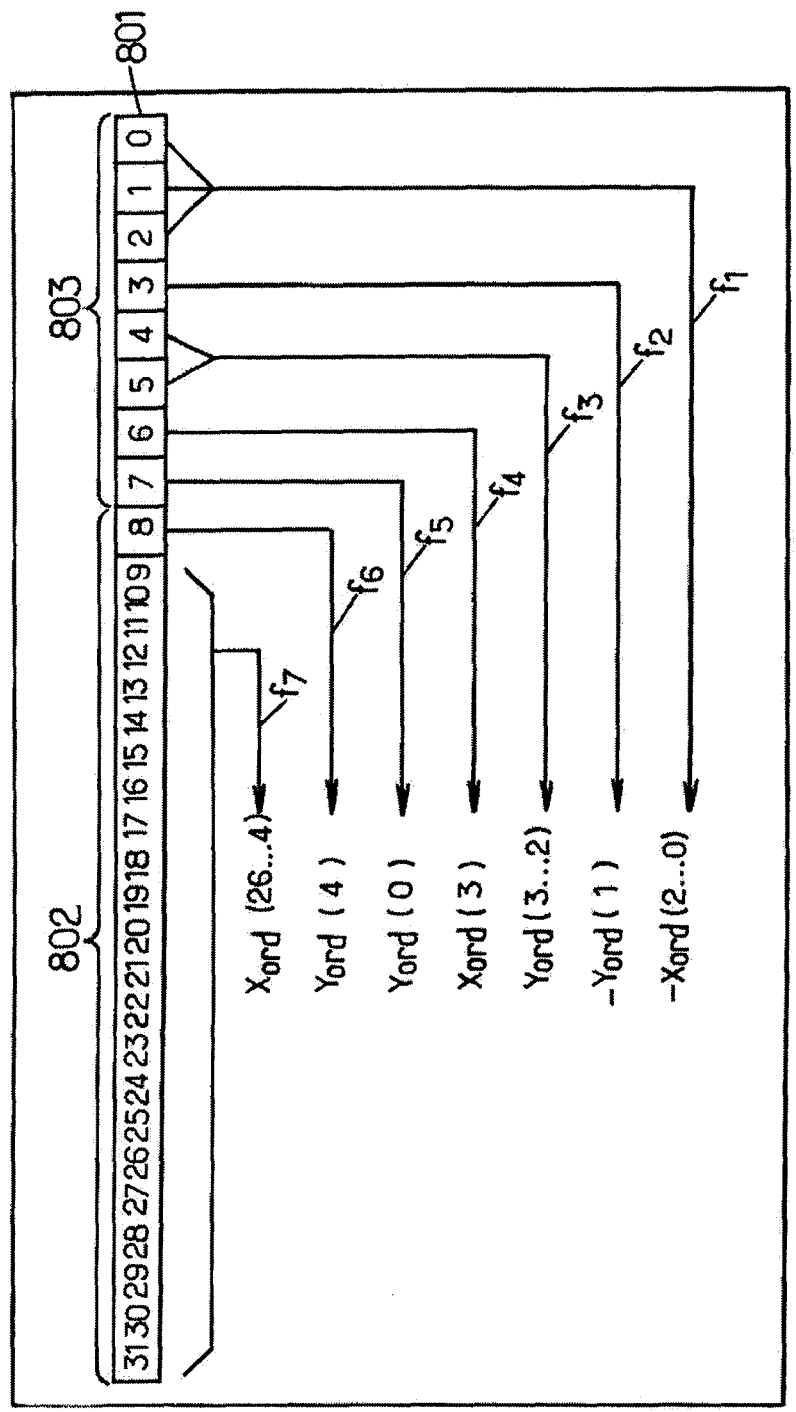
FIG. 8 illustrates a bijective function in one embodiment of the invention.

FIG. 8 illustrates a bijective function F in one embodiment of the invention. In this example, the ordered image coordinate system corresponds to the one illustrated in FIG. 7, corresponding to the second arrangement of macroblocks described with reference to FIG. 5. It therefore has the characteristic of translating a displacement of two macroblocks, or 32 pixels, along the y axis $Y_{ord}$, into a displacement of one macroblock, or 16 pixels, along the x axis $X_{ord}$.

In addition, in this example, within the same macroblock of data 302, the data are arranged in the first arrangement described with reference to FIGS. 3 and 4.

An address 801 in memory is written in 32 bits, from bits 0-31. The bijective function F advantageously converts a memory address into the coordinates of the pixel with which the data stored at this address are associated in the ordered image coordinate system.

Under such conditions, meaning when the arrangement of data in a macroblock of data corresponds to the first arrangement described and when the arrangement of macroblocks of data in memory corresponds to the second arrangement described, and when the reordered image coordinate system is based on the second arrangement, a first part 802 of the 32 bits of the memory address 801, the most significant bits, allow identifying a macroblock in the ordered image coordinate system, and a second part 803 of the 32 bits of the address 801, the least significant bits, allow identifying a pixel inside the macroblock identified by the first part of the bits.

In this example, a macroblock of pixels comprises 256 pixels. Therefore the bits 0-7 of the address 801, meaning the second part 803, identify a pixel inside a macroblock.

Then the bits 8-31 belong to the second part of the address 801, meaning they identify a macroblock in the ordered image coordinate system.

The change from 0 to 1 of the value of bit 8 of the memory address corresponds to the addition of 256 to the value of the memory address, meaning a displacement of 16 rows in memory as illustrated in FIG. 4, or a displacement of a macroblock of pixels in the ordered image coordinate system, as illustrated in FIG. 7. This displacement corresponds to a change to 1 of the value of bit 4 of the coordinate on the axis $Y_{ord}$.

The change from 0 to 1 of the value of bit 9 of the memory address corresponds to adding 512 to the value of the memory address, meaning a displacement of two macroblocks. Such a displacement is expressed in the ordered image coordinate system by a displacement of two macroblocks, meaning a displacement of a value of 16 pixels along the axis $X_{ord}$ as illustrated in FIG. 7. This displacement therefore corresponds to a change to 1 of the value of bit 4 of the coordinate on the axis $X_{ord}$.

The change from 0 to 1 of the values of bits 10-31 in the memory coordinate system is respectively translated into displacements only along the x axis $X_{ord}$ in the ordered image coordinate system. These displacements therefore respectively correspond to a change to 1 of the values of bits 5-26 of the coordinate $X_{reord}$.

The arrow $f_7$ illustrates the correspondence of bits 9-31 of the address to bits 4-26 of the coordinate on the axis $X_{ord}$.

The arrow $f_6$ illustrates the correspondence of bit 8 of the address to bit 4 of the coordinate on the axis $Y_{ord}$.

Then bits 0-7 of the memory address 801 identify a pixel inside the macroblock identified by bits 8-31.

Bits 0-2 of the memory address cover addresses 0 to 15 of a macroblock of data in memory. At these addresses are stored the data corresponding to the 16 pixels in the first row of the macroblock of pixels illustrated in FIG. 3, but in the reverse order. For example, the data corresponding to the pixel at coordinates (0,0) in the macroblock of the image are stored at address 15 in memory. As a result, the values of bits 0-2 of the memory address correspond to the inverse values of the coordinates on the x axis $X_{ord}$, as illustrated by the arrow $f_1$ in FIG. 8.

A change from 0 to 1 in the value of bit 3 of the memory address 801 corresponds to the addition of 8 to the value of the memory address. Such a displacement in memory translates in the ordered image coordinate system into a displacement along the y axis $Y_{ord}$ of a value of −2 pixels. Thus the value of bit 3 of the memory address translates into the inverse value of bit 1 of the coordinate $Y_{ord}$, as illustrated by the arrow $f_2$.

A change from 0 to 1 of the value of bit 4 of the memory address 801 corresponds to the addition of 16 to the value of the memory address. Such a displacement translates in the ordered image coordinate system into a displacement along the y axis $Y_{ord}$ of 4 pixels. Thus the value of bit 4 of the memory address translates into the value of bit 2 of the coordinate $Y_{ord}$, as illustrated by the arrow $f_3$.

A change from 0 to 1 of the value of bit 5 of the memory address corresponds to the addition of 32 to the value of the memory address. Such a displacement in memory 801 translates in the ordered image coordinate system into a displacement along the y axis $Y_{ord}$ of a value of 8 pixels. Thus the value of bit 5 of the memory address translates into the value of bit 3 of the coordinate $Y_{ord}$.

A change from 0 to 1 of the value of bit 6 of the memory address corresponds to the addition of 64 to the value of the memory address. Such a displacement in memory 801 translates in the ordered image coordinate system into a displacement along the x axis $X_{reord}$ of 8 pixels. Thus the value of bit 6 of the memory address translates into the value of bit 3 of the coordinate $X_{ord}$ (arrow $f_4$).

A change from 0 to 1 of the value of bit 7 of the memory address corresponds to adding 128 to the value of the memory address, meaning a displacement of 8 rows in memory as illustrated in FIG. 4. Such a displacement translates in the ordered image coordinate system into a displacement of one pixel along the axis $Y_{ord}$. Thus the value of bit 7 of the memory address translates into the value of bit 0 of the coordinate $Y_{ord}$ (arrow $f_5$).

Through this conversion of the values of the bits in the memory address into the respective values of the bits in the $X_{ord}$ and $Y_{ord}$ coordinates, a bijective function F is obtained which converts a memory address into coordinates in the ordered image coordinate system.

From this function F one can readily deduce an inverse function $F^{-1}$ which converts coordinates in the ordered image coordinate system into a memory address.

The chosen ordered image coordinate system could be different from what is illustrated in FIG. 7 and discussed in the example. For example, one could consider an ordered image coordinate system which only has one row, or 4, 8, or 16 rows.

In the example where the ordered image coordinate system only contains one row, the y axis $Y_{reord}$ is written in 4 bits. In this case, the description in the above paragraphs concerning bits 0-7 remains the same because it concerns a displacement within a macroblock.

However, in the ordered image coordinate system comprising only one row, a change to 1 of the value of bit 8 in the memory address, corresponding to a displacement of one macroblock, translates here into a displacement of 16 pixels along the x axis $X_{ord}$ and therefore to a change to 1 of the value of bit 4 of the coordinate on the axis $X_{ord}$.

More generally, the ordered image coordinate system has the characteristic of translating a displacement of $2^N$ macroblocks along the y axis $Y_{ord}$ into a displacement along the x axis $X_{ord}$, where N is an integer.

Such an ordered image coordinate system can therefore have a number of macroblocks per column equal to $2^N$.

In this case, advancing from one macroblock to another in the memory coordinate system, meaning a change to 1 of the value of bit 9 of the memory address, translates into:

a displacement of 16 pixels along the axis $X_{ord}$ if N is equal to 0, or a displacement of 16 pixels along the axis $Y_{ord}$ in all other cases.

Then a displacement of two macroblocks in the memory coordinate system, meaning a change to 1 of the value of bit 10 of the memory address, translates into:

a displacement of 32 pixels along the axis $X_{ord}$ if N is equal to 0, or a displacement of 16 pixels along $X_{ord}$ if N is equal to 1, or a displacement of 32 pixels along $Y_{ord}$ in all other cases.

Then a displacement of four macroblocks in the memory coordinate system, meaning a change to 1 of the value of bit 11 in the memory address, translates into:

a displacement of 64 pixels along $X_{ord}$ if N is equal to 0, or a displacement of 32 pixels along $X_{ord}$ if N is equal to 1, or a displacement of 64 pixels along $Y_{ord}$ in all other cases.

Then a displacement of eight macroblocks in the memory coordinate system, meaning a change to 1 of the value of bit 12 in the memory address, translates into:

a displacement of 128 pixels along $X_{ord}$ if N is equal to 0, or a displacement of 64 pixels along $X_{ord}$ if N is equal to 1, or a displacement of 32 pixels along $X_{ord}$ if N is equal to 2, or a displacement of 128 pixels along $Y_{ord}$ in all other cases.

One can apply the principle described above to any integer value for N.

Thus a bijective function F and its inverse function $F^{-1}$ can easily be defined no matter what value of N is used to determine the ordered image coordinate system.

In the ordered image coordinate system thus determined, the coordinates of a pixel (X",Y") pointed to by a vector of coordinates $(X_v, Y_v)$ in the spatial coordinate system of the image, relative to a reference pixel of coordinates (X',Y) in the ordered image coordinate system, satisfy the following equations:

$$X''=\{X'+X_v+([Y_v/P_{col\text{-}ref}]+[(Y'+Y_v \bmod P_{col\text{-}ref})\bmod P_{col\text{-}ref}]\}\times P_{line\text{-}image}$$

$$Y''=(Y'+Y_v \bmod P_{col\text{-}ref})\bmod P_{col\text{-}ref}$$

where $X_v$ and $Y_v$ are the coordinates of the vector, $P_{col\text{-}MB}$ corresponds to the number of pixels per column in a macroblock, $2^N$ corresponds to the number of macroblocks per column in the ordered image coordinate system, where N is an integer, $P_{col\text{-}ref}$ corresponds to the number of pixels per column in the ordered image coordinate system, where $P_{col\text{-}ref}$ is equal to $2^N \times P_{col\text{-}MB}$, $P_{line\text{-}image}$ corresponds to the number of pixels per row in the image, the mod operation corresponds to the modulus operation, and

[a/b] corresponds to the quotient of the division of a by b.

Thus an embodiment of the invention can easily be applied to a macroblock of any size comprising any number of pixels per row $P_{lines\text{-}MB}$ and any number of pixels per column $P_{col\text{-}MB}$.

In particular, the two equations above allow determining the coordinates of a pixel in an ordered image coordinate system comprising a number $2^N$ of macroblocks per column, from a vector $(X_v, Y_v)$ and from a reference pixel $(X', Y')$ in the ordered image coordinate system.

In addition, it is easy to determine a bijective function F and its inverse function $F^{-1}$ as defined with reference to FIG. 8 in the above paragraphs. These bijective functions allow converting from a memory address to the coordinates of a pixel associated with this address in the reordered coordinate system in question.

One can therefore implement a management of data to be retrieved from memory which is easily adaptable to any first and second arrangement, meaning the arrangement of data in memory inside a macroblock of data relative to the respective positions of the pixels in the corresponding macroblock of pixels and the arrangement of macroblocks of data in memory relative to the respective positions of the macroblocks of pixels in the image.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer implemented method comprising:

receiving a data request indicating a vector associated with a pixel to be processed, the vector associated with the pixel to be processed being relative to a reference pixel having a known address, the pixels being of a plurality of pixels of an image, the plurality of pixels being associated with data stored at respective data addresses, each data address being linked by a bijective function to respective coordinates (X', Y') of an ordered image reference frame relating to a position of the associated pixel in the image;

determining, by a computer processor, the coordinates of the reference pixel by applying the bijective function to the address of the data associated with the reference pixel;

obtaining, by the computer processor, the coordinates of the pixel to be processed from the coordinates of the reference pixel and from the vector associated with the pixel to be processed;

determining, by the computer processor, the address of the data associated with the pixel to be processed by applying an inverse function of the bijective function to the coordinates of the pixel to be processed; and providing, by the computer processor, the data read at the address of the data associated with the pixel to be processed, wherein the image is divided into a plurality of macroblocks of pixels corresponding respectively to macroblocks of data, the data in each macroblock of data being in a first arrangement relative to the respective positions of the pixels in said corresponding macroblock of pixels, and the macroblocks of data being arranged in memory in a second arrangement relative to the respective positions of the corresponding macroblocks of pixels in the image, the ordered image reference frame is defined based, on spatial coordinates (X,Y) of the pixel to be processed in a spatial reference frame of the image and on the second arrangement, wherein the second arrangement is such that columns of $2^N$ macroblocks of data are stored one after another by successively scanning corresponding lines of columns of $2^N$ macroblocks of pixels in the image, where N is an integer, and wherein the ordered image reference frame comprises 2N macroblocks of pixels arranged along a vertical axis, and wherein the coordinates X' and Y' in the ordered image reference frame of a pixel having spatial coordinates X and Y in the image satisfy the following equations:

$$X'=X+[Y/P_{col\text{-}ref}]\times P_{line\text{-}image}$$

$$Y'=Y \bmod P_{col\text{-}ref}$$

where mod corresponds to a modulus operation, $P_{col\text{-}ref}$ corresponds to the number of pixels per column in the ordered image reference frame, where $P_{col\text{-}ref}$ is equal to $2^N \times P_{col\text{-}MB}$, $2^N$ corresponds to the number of macroblocks per column in the ordered image reference frame, $P_{col\text{-}MB}$ corresponds to the number of pixels per column in a macroblock, and $P_{line\text{-}image}$ corresponds to the number of pixels per line in an image.

2. A method according to claim 1, wherein, each data address includes A bits and each macroblock includes $2^M$ pixels per line and per column, where A and M are integers, and wherein the bijective function:

establishes a correspondence between the (A−2×M) most significant bits of the data address and the most significant bits of the coordinates which determine, in the ordered image reference frame, the macroblock of pixels to which the associated pixel belongs, this correspondence being based on the second arrangement, and establishes a correspondence between the 2×M least significant bits of the data address and the least significant bits of the coordinates which determine, in the ordered image reference frame, the associated pixel in the determined macroblock, with this correspondence being based on the first arrangement.

3. A computer implemented method comprising:
receiving a data request indicating a vector associated with a pixel to be processed, the vector associated with the pixel to be processed being relative to a reference pixel having a known address, the pixels being of a plurality of pixels of an image, the plurality of pixels being associated with data stored at respective data addresses, each data address being linked by a bijective function to respective coordinates (X', Y') of an ordered image reference frame relating to a position of the associated pixel in the image;
determining, by a computer processor, the coordinates of the reference pixel by applying the bijective function to the address of the data associated with the reference pixel;
obtaining, by the computer processor, the coordinates of the pixel to be processed from the coordinates of the reference pixel and from the vector associated with the pixel to be processed;
determining, by the computer processor, the address of the data associated with the pixel to be processed by applying an inverse function of the bijective function to the coordinates of the pixel to be processed; and
providing, by the computer processor, the data read at the address of the data associated with the pixel to be processed, wherein, the image is divided into a plurality of macroblocks of pixels corresponding respectively to macroblocks of data,
the data in each macroblock of data being in a first arrangement relative to the respective positions of the pixels in said corresponding macroblock of pixels, and the macroblocks of data being arranged in memory in a second arrangement relative to the respective positions of the corresponding macroblocks of pixels in the image,
the ordered image reference frame is defined based on spatial coordinates (X,Y) of the pixel to be processed in a spatial reference frame of the image and on the second arrangement, wherein, in the obtaining the coordinates of the pixel to be processed, the coordinates X" and Y" of the pixel to be processed satisfy the following equations:

$$X''=\{X'+X_v+([Y_v/P_{col\text{-}re}]+[(Y'+Y_v \bmod P_{col\text{-}ref}) \bmod P_{col\text{-}ref}]\} \times P_{line\text{-}image}$$

$$Y''=(Y'+Y_v \bmod P_{col\text{-}ref}) \bmod P_{col\text{-}ref}$$

where X' and Y' correspond to the coordinates of the reference pixel in the ordered image reference frame,
$X_v$ and $Y_v$ are the coordinates of the vector,
$P_{col\text{-}ref}$ corresponds to the number of pixels per column in the ordered image reference frame, where $P_{col\text{-}ref}$ is equal to $2^N \times P_{col\text{-}MB}$,
$P_{col\text{-}MB}$ corresponds to the number of pixels per column in a macroblock,
$2^N$ corresponds to the number of macroblocks per column in the ordered image reference frame, where N is an integer,
$P_{line\text{-}image}$ corresponds to the number of pixels per line in the image, and
the mod operation corresponds to a modulus operation.

4. An interface device for an image processing system that includes a memory and a processing device, the interface device comprising:
a first interface unit structured to receive from the image processing device a data request indicating a vector associated with a pixel to be processed, and provide requested data to the image processing device, the vector associated with the pixel to be processed being relative to a reference pixel having a known address, the pixels being of a plurality of pixels of an image, the plurality of pixels being associated with data stored at respective data addresses, each data address being linked by a bijective function to respective coordinates (X', Y') of an ordered image reference frame relating to a position of the associated pixel in the image;
a second interface unit structured to obtain the requested data from the memory; and
a determination unit structured to determine the data address for the requested data by determining the coordinates of the reference pixel in the ordered image reference frame by applying the bijective function to the data address of the reference pixel, determining coordinates of the pixel to be processed by adding the vector to the determined coordinates of the reference pixel, and applying an inverse function of the bijective function to the coordinates of the pixel to be processed,
wherein, the image is divided into plural macroblocks of pixels corresponding respectively to macroblocks of data, the data in each macroblock of data being in a first arrangement relative to the respective positions of the pixels in said corresponding macroblock of pixels, and the macroblocks of data being arranged in memory in a second arrangement relative to respective positions of the macroblocks of pixels in the image, the ordered image reference frame being defined based on spatial coordinates X and Y in the image of the pixel to be processed and on the second arrangement relative to the macroblocks of pixels in the image, wherein the determination unit determines the coordinates X" and Y" of the pixel to be processed, by adding the vector indicated in the request to the coordinates X' and Y' of the reference pixel in the ordered image reference frame, according to the following equations:

$$X''=\{X'+X_v+(\{Y_v/P_{col\text{-}ref}\}+[(Y'+Y_v \bmod P_{col\text{-}ref}]\} \times P_{line\text{-}image}$$

$$Y''=(Y'+Y_v \bmod P_{col\text{-}ref}) \bmod P_{col\text{-}ref}$$

where $X_v$ and $Y_v$ are the coordinates of the vector,
$P_{col\text{-}MB}$ corresponds to the number of pixels per column in a macroblock,
$2^N$ corresponds to the number of macroblocks per column in the ordered image reference frame, where N is an integer,
$P_{col\text{-}ref}$ corresponds to the number of pixels per column in the ordered image reference frame, where $P_{col\text{-}ref}$ is equal to $2^N \times P_{col\text{-}MB}$,
$P_{line\text{-}image}$ corresponds to the number of pixels per line in the image, and
the mod operation corresponds to a modulus operation.

5. An interface device for an image processing system that includes a memory and a processing device, the interface device comprising:
a first interface unit structured to receive from the image processing device a data request indicating a vector associated with a pixel to be processed, and provide requested data to the image processing device, the vector associated with the pixel to be processed being relative to a reference pixel having a known address, the pixels being of a plurality of pixels of an image, the plurality of pixels being associated with data stored at respective data addresses, each data address being linked by a bijective function to respective coordinates (X', Y') of an ordered image reference frame relating to a position of the associated pixel in the image;

a second interface unit structured to obtain the requested data from the memory; and a determination unit structured to determine the data address for the requested data by determining the coordinates of the reference pixel in the ordered image reference frame by applying the bijective function to the data address of the reference pixel, determining coordinates of the pixel to be processed by adding the vector to the determined coordinates of the reference pixel, and applying an inverse function of the bijective function to the coordinates of the pixel to be processed, wherein, the image is divided into plural macroblocks of pixels corresponding respectively to macroblocks of data, the data in each macroblock of data being in a first arrangement relative to the respective positions of the pixels in said corresponding macroblock of pixels, and the macroblocks of data being arranged in memory in a second arrangement relative to respective positions of the macroblocks of pixels in the image, the ordered image reference frame being defined based on spatial coordinates X and Y in the image of the pixel to be processed and on the second arrangement relative to the macroblocks of pixels in the image, wherein the determination unit manages the application of the second arrangement to the macroblocks of pixels, and obtains the coordinates X' and Y' in the ordered image reference frame for a pixel having spatial coordinates X and Y in the image, by the following equations:

$$X' = X + [Y/P_{col\text{-}ref}] \times P_{line\text{-}image}$$

$$Y' = Y \bmod P_{col\text{-}ref}$$

where mod corresponds to a modulus operation, $P_{col\text{-}MB}$ corresponds to the number of pixels per column in a macroblock, $2^N$ corresponds to the number of macroblocks per column in the ordered image reference frame, where N is an integer, $P_{col\text{-}ref}$ corresponds to the number of pixels per column in the ordered image reference frame where $P_{col\text{-}ref}$ is equal to $2^N \times P_{col\text{-}MB}$, and $P_{line\text{-}image}$ corresponds to the number of pixels per line in an image.

6. An interface device according to claim 5, wherein, each data address includes A bits and each macroblock includes $2^M$ pixels per line and per column, where A and M are integers, and the bijective function:
  establishes a correspondence between the (A−2×M) most significant bits of the data address and the most significant bits of the coordinates, which determine in the ordered image reference frame, the macroblock of pixels to which the associated pixel belongs, with this correspondence being based on the second arrangement, and
  establishes a correspondence between the 2×M least significant bits of the address and the least significant bits of the coordinates, which determine in the ordered image reference frame, the associated pixel in the determined macroblock, with this correspondence being based on the first arrangement.

7. An image processing system, comprising:

a memory that stores at respective data addresses data respectively associated with pixels in an image, each data address being linked by a bijective function to respective coordinates (X', Y') of the associated pixel in an ordered image reference frame relating to a position of the pixel in the image;

a processing device structured to process the data respectively associated with the pixels; and an interface device coupled between the memory and the processing device, and including:

a first interface unit structured to receive from the image processing device a data request indicating a vector associated with a pixel to be processed, and provide requested data to the image processing device, the vector associated with the pixel to be processed being relative to a reference pixel having a known address, the pixels being of a plurality of pixels of an image, the plurality of pixels being associated with data stored at respective data addresses, each data address being linked by a bijective function to respective coordinates (X', Y') of an ordered image reference frame relating to a position of the associated pixel in the image;

a second interface unit structured to obtain the requested data from the memory; and a determination unit structured to determine the data address for the requested data by determining the coordinates of the reference pixel in the ordered image reference frame by applying the bijective function to the data address of the reference pixel, determining coordinates of the pixel to be processed by adding the vector to the determined coordinates of the reference pixel, and applying an inverse function of the bijective function to the coordinates of the pixel to be processed, wherein, the image is divided into plural macroblocks of pixels corresponding respectively to macroblocks of data, the data in each macroblock of data being in a first arrangement relative to the respective positions of the pixels in said corresponding macroblock of pixels, and the macroblocks of data being arranged in memory in a second arrangement relative to respective positions of the macroblocks of pixels in the image, the ordered image reference frame being defined based on spatial coordinates X and Y in the image of the pixel to be processed and on the second arrangement relative to the macroblocks of pixels in the image, wherein the determination unit manages the application of the second arrangement to the macroblocks of pixels, and obtains the coordinates X' and Y' in the ordered image reference frame for a pixel having spatial coordinates X and Y in the image, by the following equations:

$$X' = X + [Y/P_{col\text{-}ref}] \times P_{line\text{-}image}$$

$$Y' = Y \bmod P_{col\text{-}ref}$$

where mod corresponds to a modulus operation, $P_{col\text{-}MB}$ corresponds to the number of pixels per column in a macroblock, $2^N$ corresponds to the number of macroblocks per column in the ordered image reference frame, where N is an integer, $P_{col\text{-}ref}$ corresponds to the number of pixels per column in the ordered image reference frame where $P_{col\text{-}ref}$ is equal to $2^N \times P_{col\text{-}MB}$, and $P_{line\text{-}image}$ corresponds to the number of pixels per line in an image.

8. An image processing system according to claim 7, wherein, each data address includes A bits and each macroblock includes $2^M$ pixels per line and per column, where A and M are integers, and the bijective function:
    establishes a correspondence between the (A−2×M) most significant bits of the data address and the most significant bits of the coordinates, which determine in the ordered image reference frame, the macroblock of pixels to which the associated pixel belongs, with this correspondence being based on the second arrangement, and
    establishes a correspondence between the 2×M least significant bits of the address and the least significant bits of the coordinates, which determine in the ordered image reference frame, the associated pixel in the determined macroblock, with this correspondence being based on the first arrangement.

9. An image processing system, comprising:
a memory that stores at respective data addresses data respectively associated with pixels in an image, each data address being linked by a bijective function to respective coordinates (X', Y') of the associated pixel in an ordered image reference frame relating to a position of the pixel in the image;
a processing device structured to process the data respectively associated with the pixels; and
an interface device coupled between the memory and the processing device, and including:
a first interface unit structured to receive from the image processing device a data request indicating a vector associated with a pixel to be processed, and provide requested data to the image processing device, the vector associated with the pixel to be processed being relative to a reference pixel having a known address, the pixels being of a plurality of pixels of an image, the plurality of pixels being associated with data stored at respective data addresses, each data address being linked by a bijective function to respective coordinates (X', Y') of an ordered image reference frame relating to a position of the associated pixel in the image;
a second interface unit structured to obtain the requested data from the memory; and
a determination unit structured to determine the data address for the requested data by determining the coordinates of the reference pixel in the ordered image reference frame by applying the bijective function to the data address of the reference pixel, determining coordinates of the pixel to be processed by adding the vector to the determined coordinates of the reference pixel, and applying an inverse function of the bijective function to the coordinates of the pixel to be processed,
wherein, the image is divided into plural macroblocks of pixels corresponding respectively to macroblocks of data, the data in each macroblock of data being in a first arrangement relative to the respective positions of the pixels in said corresponding macroblock of pixels, and the macroblocks of data being arranged in memory in a second arrangement relative to respective positions of the macroblocks of pixels in the image, the ordered image reference frame being defined based on spatial coordinates X and Y in the image of the pixel to be processed and on the second arrangement relative to the macroblocks of pixels in the image, wherein the determination unit determines the coordinates X" and Y" of the pixel to be processed, by adding the vector indicated in the request to the coordinates X' and Y' of the reference pixel in the ordered image reference frame, according to the following equations:

$$X''=\{X'+X_v+([Y_v/P_{col-re}]+[(Y'+Y_v \bmod P_{col-ref})\bmod P_{col-ref}])\times P_{line-image}$$

$$Y''=(Y'+Y_v \bmod P_{col-ref})\bmod P_{col-ref}$$

where $X_v$ and $Y_v$ are the coordinates of the vector,
$P_{col-MB}$ corresponds to the number of pixels per column in a macroblock,
$2^N$ corresponds to the number of macroblocks per column in the ordered image reference frame, where N is an integer,
$P_{col-ref}$ corresponds to the number of pixels per column in the ordered image reference frame, where $P_{col-ref}$ is equal to $2^N \times P_{col-MB}$,
$P_{line-image}$ corresponds to the number of pixels per line in the image, and
the mod operation corresponds to a modulus operation.

* * * * *

UNITED STATES PATENT AND TRADEMARK OFFICE
CERTIFICATE OF CORRECTION

PATENT NO. : 8,174,533 B2
APPLICATION NO. : 11/766460
DATED : May 8, 2012
INVENTOR(S) : Patrice Couvert et al.

It is certified that error appears in the above-identified patent and that said Letters Patent is hereby corrected as shown below:

Column 14, Line 38:
"$X'=X+[Y/P_{col-ref} \times P_{line-image}$" should read, --$X'=X + [Y/P_{col-ref}] \times P_{line-image}$--.

Column 15, Lines 42-43:
"$X''=\{X'+X_v+([Y_v/P_{col-re}+[(Y'+Y_v \bmod P_{col-ref})\bmod P_{col-ref}]\}\times P_{line-image}$" should read, --$X''= \{X' + X_v + ([Y_v/P_{col-ref}] + [(Y' + Y_v \bmod P_{col-ref})\bmod P_{col-ref}]\} \times P_{line-image}$--.

Column 16, Lines 37-38:
"$X''=\{X'+X_v+(\{Y_v/P_{col-ref}]+[(Y'+Y_v \bmod P_{col-ref}]\}\times P_{line-image}$" should read, --$X'' = \{X' + X_v + ([Y_v/P_{col-ref}] + [(Y' + Y_v \bmod P_{col-ref})\bmod P_{col-ref}]\} \times P_{line-image}$--.

Signed and Sealed this
Sixth Day of November, 2012

David J. Kappos
*Director of the United States Patent and Trademark Office*